Patented Dec. 19, 1950

2,534,304

UNITED STATES PATENT OFFICE 2,534,304

ESTERIFICATION WITH BORON FLUORIDE-HYDROXY POLYETHER COMPLEXES

George E. Serniuk, Roselle, and Byron M. Vanderbilt, Westfield, N. J., assignors to Standard Oil Development Company, a corporation of Delaware No Drawing. Application January 2, 1948, Serial No. 382

5 Claims. (Cl. 260—497)

1

This invention relates to new compositions of matter comprising boron fluoride. More particularly, the invention is concerned with new compositions of matter consisting of a complex resulting from the combination of boron fluoride with hydroxy polyethers.

This invention is also concerned with the use of boron fluoride-hydroxy polyether complexes to catalyze chemical reactions such as the hydration of olefins, the esterification of acids with olefins, the production of ethers from olefins and alcohols, the condensation of olefins with mercaptans, phenols, thiophenols, hydrogen sulfide, sulfur dioxide and other reagents capable of adding to the olefinic linkage. The complexes are also useful as catalysts in the conversion of alcohols to ethers, and in the alkylation and polymerization of hydrocarbons, including the polymerization and copolymerization of isobutylene, styrene, diolefins and the like at temperatures below about 0° C. The complexes may also be employed for separating tertiary base olefins from secondary base olefins.

Boron fluoride complexes with low molecular weight ethers have been used successfully as catalysts for various condensation and polymerization reactions. Such catalysts however, possess the disadvantage that in the process of recovering the reaction products from the catalyst, the catalyst complex is usually destroyed by decomposition and the valuable $BF_3$ is either lost or must be recovered by additional facilities. Catalyst decomposition is not desirable and facilities for recovery of $BF_3$ entail employment of additional equipment. Likewise, the recovered $BF_3$ must be again converted to the complex before being recycled to the reaction zone.

It has now been found that boron fluoride forms extremely stable non-volatile complexes with hydroxy polyethers including mono-hydroxy polyethers and polyhydroxy polyethers, and that these complexes exhibit none of the undesirable decomposition characteristics of other boron fluoride complexes. Since the boron fluoride-hydroxy polyethers are stable at elevated temperatures they can be easily recovered from the reaction products of reactions which they catalyze and can be recycled to the reaction zone. These complexes are particularly advantageous in those chemical reactions the products of which are sufficiently volatile that they can be recovered by distillation leaving the $BF_3$-hydroxy polyether complex behind as a residue.

2

PREPARATION OF $BF_3$-HYDROXY POLYETHER COMPLEXES

The boron fluoride-hydroxy polyether complexes are conveniently prepared by passing gaseous $BF_3$ into a solution or suspension of a hydroxy polyether. The preferred complexes for catalytic purposes, as will be set out below, are those containing one mol of hydroxy polyether per mol of $BF_3$ although complexes may be formed containing two or more mols of hydroxy polyether per mol of $BF_3$; or containing more than one mol of $BF_3$ per mol of hydroxy polyether. The hydroxy polyether compound employed in the formation of the $BF_3$ complex may be an aromatic, cyclic or aliphatic hydroxy polyether. $BF_3$ complexes may be prepared by passing $BF_3$ into a solution or suspension of any of the hydroxy polyethers whose preparation will now be described.

The $BF_3$-hydroxy polyether complexes employed in accordance with the terms of this invention are materials corresponding to the formula:

$$QR[-(O-C_nH_{2n})_x-OH]_y \cdot (BF_3)_z$$

wherein Q is a radical chosen from the class consisting of electronegative groups and hydrogen; $x$, $y$, $z$ and $n$ each represent a number at least one, and R is a residue of an aliphatic, aromatic, or cyclic hydrocarbon, or hydrocarbon substituents of these radicals such as aralkyl, alkylaryl, etc.

PREPARATION OF HYDROXY POLYETHERS

The hydroxy polyethers employed to form complexes with $BF_3$ according to the terms of this invention include those mono-, di-, and polyhydroxy polyethers prepared by condensing a compound having a reactive hydroxyl group with two or more mols of an olefin oxide such as ethylene oxide, propylene oxide, etc., ethylene oxide being preferred. The compounds possessing a reactive hydroxyl group capable of forming a hydroxy polyether with an olefin oxide are numerous and include the alcohols, aromatic, cyclic and aliphatic; the glycols; phenol and its derivatives, particularly its alkylated derivatives; naphthol and its derivatives; the hydroxy acids and fatty acids; the hydroxy esters such as castor oil, etc. Other substituent groups may be present in the molecule such as electronegative radicals. The product obtained from the reaction between the hydroxy compound and the olefin oxide contains a long aliphatic chain (from the olefin oxide) consisting of ether linkages with an OH group at the end. The polyethers are non-ionic in character. The major part of the molecule comes from the condensed olefin oxide and therefore the hydroxy polyether compounds are predominantly aliphatic in nature. Such hydroxy polyethers are excellent wetting agents and are available commercially as such.

Suitable hydroxy polyether, for purposes of this invention, may be prepared from the following condensations with an olefin oxide preferably ethylene oxide:

Oleyl alcohol+7–20 mols ethylene oxide (liquid to waxy)
Lauryl alcohol+7–20 mols ethylene oxide (liquid to waxy)
Oleic acid+6 mols ethylene oxide (liquid)
Alkyl phenols+6 mols ethylene oxide (liquid)
Castor oil+20–40 mols ethylene oxide (liquid to waxy)
Alkyl phenols+20 mols ethylene oxide (liquid to waxy paste)

The condensation of the hydroxy compound with ethylene oxide is carried out by heating the hydroxy compound with a trace of caustic soda or potash to a temperature of 150°–180° C. and evacuated to about 10 mm. pressure. Air is evacuated from the reaction zone by use of nitrogen and the nitrogen is removed by displacement with gaseous ethylene oxide. Liquid ethylene oxide is then added to the reactor with rapid stirring. The reaction is highly exothermic and explosive mixtures of air and ethylene oxide are to be avoided. The temperature of the reaction mass rises during the addition of ethylene oxide and should be held between about 185° and 210° C. After addition of ethylene oxide is complete the mass is cooled to about 100° C. The product is an oily liquid which with increasing ethylene oxide content becomes pasty to waxy. Its water solubility increases with an increasing ratio of ethylene oxide.

The hydroxy polyethers prepared according to the method outlined will correspond to the following formula:

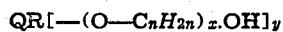

where Q is a radical chosen from the class consisting of electronegative groups and hydrogen; and $x$, $y$ and $n$ each represent a number at least one, and R is a residue of an aliphatic, aromatic, or cyclic hydrocarbon, or hydrocarbon substituents thereof, such as aralkyl, alkylaryl, etc.

The utility of the $BF_3$-hydroxy polyether catalysts in the numerous chemical reactions may be illustrated by the following examples:

HYDRATION OF TERTIARY OLEFINS

The hydration of olefins to alcohols using dilute acid solution such as those of sulfuric, hydrochloric or phosphoric acid or $BF_3$-water complexes is not commercially feasible in many cases due to the slow reaction rate. It has been found that the rate of hydration can be increased considerably by carrying out the hydration in the presence of a $BF_3$-hydroxy polyether complex. The hydroxy polyether portion of the complex facilitates the reaction of the aqueous and oil layers, and the $BF_3$ is no doubt distributed between the two polar substances, viz., the water and the hydroxy polyether. The important point is that the hydroxy polyether serves to emulsify the two layers without poisoning the effect of the $BF_3$, and allows separation of the two layers on standing after mechanical agitation is terminated. Certain emulsifiers such as soaps or sulfates destroy the activity of the $BF_3$.

The following examples illustrate this feature of the invention:

Example I

A glass reactor was charged with 400 cc. of water, 40 grams of a hydroxy polyether prepared by condensing one mol of oleyl alcohol with 16–20 mols of ethylene oxide. A suspension was formed and into the suspension was bubbled 175 gm. of $BF_3$. 168 gms. of isobutylene were then added. The reactor was sealed and placed on a rotating wheel fixed in a water bath maintained at 26° C. After 40 hours the reaction mass was charged to a distillation flask and the alcohol product was distilled out under reduced pressure. 191 gms. of tertiary butyl alcohol (B. P. 40–43° C. at 85–90 mm. pressure) were obtained.

Example II

The same reactor was again charged with 400 cc. of water, 40 gms. of the same hydroxy polyether as in Example I, 68 gms. of $BF_3$ and 180 gms. of isobutylene. The reaction was run for 1 hour at 26° C. 14 gms. of tertiary butyl alcohol (6.3% yield) were obtained.

Example III

The same reaction as in Example II was repeated under the same reaction conditions except that the hydroxy polyether was omitted. After 1 hour at 26° C. the reaction mass yielded on distillation, 6 gms. of t-butyl alcohol (2.7% yield).

Instead of isobutylene, other tertiary base olefins such as trimethyl ethylene, 2-methyl butene-1, 2-methyl pentene-1 and the like may be so hydrated. The temperature employed during the hydration is in the range of 0° C. to 100° C., preferably 25° C. to 60° C.

PREPARATION OF ESTERS

The $BF_3$-hydroxy polyether complexes have been found to be excellent catalysts for the production of esters from olefins and acids at temperatures between 0° C. and 100° C., preferably about 50° C. It is possible to remove the esterification reaction products by distillation and yet retain good catalyst activity in a second cycle. The following examples serve to demonstrate this feature of the invention:

Example IV

A $BF_3$-hydroxy polyether complex was prepared by passing $BF_3$ gas into 40 gms. of a hydroxy polyether (prepared by condensing oleyl alcohol with 16–20 mols of ethylene oxide) dissolved in 180 gms. of acetic acid until 99 gms. of $BF_3$ were absorbed. The above mixture was poured into a glass reactor together with 168 gms. of butene-1. The vessel was sealed and placed on a rotating wheel fixed in a water bath maintained at 25° C. After a total of 17 hours' reaction time, the contents of the vessel were poured into water and the top oily layer was separated from the lower aqueous layer. The product was washed and isolated in the conventional manner. The product was distilled at atmospheric pressure and there were obtained 175 gms. (50% yield) of a water-white distillate, B. P. 111–113° C. identified as secondary butyl acetate.

Example V

A total of 180 gms. of glacial acetic acid was employed to dissolve 40 gms. of the same hydroxy polyether as in Example IV. The solution was cooled in a freezing mixture while passing in BF₃ gas. A total of 67.8 gms. of BF₃ was added. This mixture was charged to a glass reactor together with 168 gms. of butene-1. The reactor was heated for 17 hours at 50° C. The reaction mass was charged to a distilling flask and the ester formed was distilled away from the BF₃-hydroxy polyether catalyst at reduced pressure. 176.3 gms. (50.6% yield) of water-white distillate were obtained, B. P. 55° C. at 85 mm. pressure, and identified as secondary butyl acetate.

Example VI

The BF₃-hydroxy polyether catalyst residue from the distillation in Example V was dissolved in 180 gms. of glacial acetic acid and charged to a reactor as above with 170 gms. of butene-1. After reacting at 50° C. for 45 hours, there were obtained 253.1 gms. of sec-butyl acetate (73% yield) as distillate, B. P. 55° C. at 85 mm. pressure.

In place of the acetic acid mentioned in Examples IV, V and VI, other organic acids may be used such as formic, propionic, butyric as well as higher members of the fatty acid series such as oleic, stearic and the like, or mixtures thereof such as are obtained by the oxidation of paraffin wax or of petroleum hydrocarbons, or such as are obtained from the catalytic hydrogenation of carbon oxides in the well known hydrocarbon syntheses. Also, instead of the aliphatic acids, aromatic acids such as benzoic acid, and also ring compounds containing an acid grouping in an aliphatic side chain may be used. Substituted organic acids, their derivatives and homologues may be used. Dibasic and polybasic carboxylic acids are also included in the above scope. Of course, other olefins can be employed in place of the butene-1 used in the examples. For example, pentene-2 can be employed with acetic acid to produce sec-amyl acetate. Other mono-olefins such as ethylene, propylene, butene-2, isobutylene, trimethylethylene, hexene-1 and the like, similarly react to form their corresponding esters. Cyclic olefins such as cyclohexene and cyclopentene also yield corresponding esters as do aromatic substituted olefins such as styrene and isopropenyl benzene, etc. Diolefins and other polyolefins are likewise operable.

PRODUCTION OF ETHERS

The BF₃-hydroxy polyether complexes are also excellent catalysts for the production of ethers by the reaction between olefins and alcohols. The technique is exactly the same as that employed in Examples IV, V, and VI for the production of esters except that an alcohol or alcoholic radical containing material is employed in place of the acid. The same temperature range prevails, i. e., approximately 0° C. to about 100° C., preferably about 25°–60° C. The following examples will serve to illustrate this feature of the invention:

Example VII

Methyl tertiary amyl ether can be prepared by passing BF₃ gas into 40 gms. of a hydroxy polyether (obtained by condensing oleyl alcohol with 16–20 mols of ethylene oxide) dissolved in 96 gms. of methyl alcohol. After the BF₃ is absorbed the mixture is placed in a reactor, 254 gms. of trimethyl ethylene are added, and the reactor agitated in a rotating wheel in a water bath maintained at 25–50° C. Methyl tertiary amyl ether is recovered from the reaction mass by distillation under reduced pressure.

Example VIII

Methyl tertiary butyl ether can be prepared in a manner described in Example VII, employing isobutylene in place of the trimethyl ethylene.

SEPARATION OF TERTIARY OLEFINS FROM SECONDARY OLEFINS

The BF₃-hydroxy polyether complexes can be employed as catalysts in a hydration process wherein tertiary olefins can be separated from secondary olefins. In this process the tertiary olefin is hydrated directly to the corresponding alcohol at a temperature below 100° C., preferably around room temperature in the presence of an aqueous solution of the BF₃-hydroxy polyether complex. The secondary olefin is not hydrated. The tertiary alcohol may then be separated from the secondary olefin by distillation. For instance, if the olefinic gases from a petroleum refining operation are to be employed in the manufacture of alcohols by adsorption in sulfuric acid, the troublesome tertiary-base olefins may first be removed from the olefin stream by scrubbing with an aqueous solution of a BF₃-hydroxy polyether complex. Such a treatment leaves the secondary-base olefins unchanged. The following examples will serve to illustrate this feature of the invention:

Example IX

A two-liter three-way flask fitted to a mechanical stirrer and thermometer was charged with 500 cc. of water and 40 gms. of a BF₃-hydroxy polyether prepared by condensing oleyl alcohol with 16–20 mols of ethylene oxide. 130 gms. of BF₃ was added to this solution, and the solution was cooled to 25° C. While the solution is rapidly agitated, 330 gms. of a pentene-1 fraction from petroleum sources was added. The mixture was agitated for 48 hours at 25–26° C. Unreacted olefin was removed, and thereafter 5 gms. of tertiary amyl alcohol was obtained. The unreacted pentene was found to contain no tertiary-base olefins.

Example X

The experiment of Example IX was repeated employing 175 gms of BF₃ and 200 gms. of butene-1 in a glass reactor which was sealed and agitated on a rotating wheel at 35° C. for 40 hours. At the end of the 40 hours, the reactor was still under pressure indicating that the butene-1 was not hydrated. After discharging the products no secondary butyl alcohol could be detected.

Example XI

The experiment of Example X was repeated employing propylene in a similar catalyst mixture for 12 hours at 35° C. The reaction mass did not yield any propyl alcohol.

Example XII

The experiment was again repeated employing ethylene under conditions of experiment XI. No ethyl alcohol was obtained.

Example XIII

The experiment was again repeated under conditions whereby 168 gms. of isobutylene was contacted for 40 hours at 26° C. with the catalyst mixture of Example IX. The reaction mass on distillation yielded 83% of recoverable tertiary butyl alcohol. No recoverable isobutylene was left in the reactor.

Although the invention has been illustrated by the use of a $BF_3$ complex with a hydroxy polyether prepared by reacting oleyl alcohol with 16–20 mols of ethylene oxide, the invention is not intended to be limited thereto, as any of the reaction products obtained from the condensation reactions previously listed may be employed. Chemical names of some of the compounds available commercially are:

Diisohexyl isoheptyl phenyl polyglycol ether
Dodecyl phenyl polyglycol ether
Isooctyl phenyl polyglycol ether
Oleyl polyglycol ether
Lauryl polyglycol ether
Isohexyl beta naphthyl polyglycol ether, etc.

What is claimed is:

1. A $BF_3$ complex of a hydroxy polyether said hydroxy polyether being obtained by condensing oleyl alcohol with ethylene oxide.

2. A $BF_3$ complex of a hydroxy polyether said hydroxy polyether being obtained by condensing one mole of oleyl alcohol with 16 to 20 moles of ethylene oxide.

3. Process for preparing esters which comprises reacting an olefin with a carboxylic acid in the presence of a catalyst comprising a $BF_3$-hydroxy polyether complex, said hydroxy polyether being obtained by reacting a high molecular weight alcohol with ethylene oxide.

4. Process for preparing secondary butyl acetate which comprises reacting normal butene with acetic acid in the presence of a catalyst comprising a $BF_3$-hydroxy polyether complex, said hydroxy polyether being obtained by reacting a high molecular weight alcohol with ethylene oxide.

5. Process according to claim 4 in which the catalyst is a $BF_3$ complex of a hydroxy polyether, said hydroxy polyether being obtained by condensing one mole of oleyl alcohol with 16 to 20 moles of ethylene oxide.

GEORGE E. SERNIUK.
BYRON M. VANDERBILT.

REFERENCES CITED

The following references are of record in the file of this patent:

UNITED STATES PATENTS

| Number | Name | Date |
| --- | --- | --- |
| 2,065,540 | Schneider | Dec. 29, 1936 |
| 2,135,457 | Loder | Nov. 1, 1938 |
| 2,135,458 | Schultz | Nov. 1, 1938 |
| 2,197,023 | Schneider | Apr. 16, 1940 |
| 2,399,126 | Lien | Apr. 23, 1946 |